(12) United States Patent
Brewster

(10) Patent No.: US 6,247,821 B1
(45) Date of Patent: Jun. 19, 2001

(54) COMBINED FORWARD AND REARWARD VIEWING MIRROR SYSTEM

(76) Inventor: Garvin Brewster, 38 Mayfield Avenue Kenton Harrow, Middlesex HA3 8EU (GB)

( * ) Notice: Subject to any disclaimer, the term of this patent is extended or adjusted under 35 U.S.C. 154(b) by 0 days.

(21) Appl. No.: 09/544,430

(22) Filed: Apr. 7, 2000

(51) Int. Cl.[7] .............. G02B 5/08; G02B 7/182; B60R 1/06; B60R 1/10

(52) U.S. Cl. .......... 359/841; 359/850; 359/855; 359/865; 359/872

(58) Field of Search ............... 359/841, 850, 359/854, 855, 856, 857, 858, 861, 862, 863, 865, 872

(56) References Cited

U.S. PATENT DOCUMENTS

| | | | |
|---|---|---|---|
| 2,302,952 | * 11/1942 | Pfeifer | 359/862 |
| 2,796,003 | * 6/1957 | Kaufman | 359/862 |
| 2,854,882 | * 10/1958 | Cooper | 359/862 |
| 3,712,715 | * 1/1973 | Wagner | 359/855 |
| 4,165,156 | * 8/1979 | O'Connell | 359/841 |
| 4,268,120 | * 5/1981 | Jitsumori | 359/850 |
| 4,685,779 | * 8/1987 | Gonzalez | 359/841 |
| 4,998,812 | * 3/1991 | Hou | 359/841 |
| 5,245,480 | * 9/1993 | Polzer | 359/841 |
| 5,424,875 | * 6/1995 | Davis, II | 359/850 |
| 5,644,443 | * 7/1997 | Hung | 359/856 |
| 5,751,490 | * 5/1998 | Johnson | 359/872 |
| 6,012,819 | * 1/2000 | Pai | 359/855 |

FOREIGN PATENT DOCUMENTS

| | | | |
|---|---|---|---|
| 2918822 | * 11/1980 | (DE) | 359/857 |
| 3442078 | * 1/1986 | (DE) | 359/857 |
| 2641243 | * 7/1990 | (FR) | 359/857 |
| 2208633 | * 4/1989 | (GB) | 359/857 |
| 2210835 | * 6/1989 | (GB) | 359/857 |
| 0570792 | * 12/1957 | (IT) | 359/862 |
| 8605749 | * 10/1986 | (WO) | 359/850 |

* cited by examiner

Primary Examiner—Ricky D. Shafer

(57) ABSTRACT

A combined forward and rearward viewing mirror system for seeing around vehicles. The combined forward and rearward viewing mirror system includes a system for permitting a driver using the mirror system to see objects forward and reward of the automobile. The system is mountable to a motor vehicle. The system comprises a housing having a front side, a back side, a proximal end and distal end. The front side has an opening therein to permit viewing into an interior of the housing. A window is in the front side for seeing forward through the housing. An arm having a first end and a second end secures the housing to a motor vehicle. The first end of the arm is adapted for mounting to the automobile door. The second end of the arm is coupled to the housing. A first mirror for viewing objects rearward of the motor vehicle is mounted in the interior of the housing and is angled toward the proximal end of the housing. A second mirror for viewing objects forward of the automobile is mounted in the interior of the housing and is oriented generally toward the front side of the housing. A third mirror for viewing objects forward of the automobile is mounted in the interior of the housing and is oriented toward the front side of the housing.

8 Claims, 2 Drawing Sheets

COMBINED FORWARD AND REARWARD VIEWING MIRROR SYSTEM

BACKGROUND OF THE INVENTION

1. Field of the Invention

The present invention relates to mirror systems and more particularly pertains to a new combined forward and rearward viewing mirror system for seeing around vehicles.

2. Description of the Prior Art

The use of mirror systems is known in the prior art. More specifically, mirror systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,685,779; U.S. Pat. No. 4,277,142; U.S. Pat. No. 2,197,280; U.S. Pat. Des. No. 391,214; U.S. Pat. No. 3,744,885; and U.S. Pat. No. 4,964,712.

While these devices fulfill their respective, particular objectives and requirements, the aforementioned patents do not disclose a new combined forward and rearward viewing mirror system. The inventive device includes a system for permitting a driver using the mirror system to see objects forward and reward of the automobile. The system is mountable to a motor vehicle. The system comprises a housing having a front side, a back side, a proximal end and distal end. The front side has an opening therein to permit viewing into an interior of the housing. A window is in the front side for seeing forward through the housing. An arm having a first end and a second end secures the housing to a motor vehicle. The first end of the arm is adapted for mounting to the automobile door. The second end of the arm is coupled to the housing. A first mirror for viewing objects rearward of the motor vehicle is mounted in the interior of the housing and is angled toward the proximal end of the housing. A second mirror for viewing objects forward of the automobile is mounted in the interior of the housing and is oriented generally toward the front side of the housing. A third mirror for viewing objects forward of the automobile is mounted in the interior of the housing and is oriented toward the front side of the housing.

In these respects, the combined forward and rearward viewing mirror system according to the present invention substantially departs from the conventional concepts and designs of the prior art, and in so doing provides an apparatus primarily developed for the purpose of seeing around vehicles.

SUMMARY OF THE INVENTION

In view of the foregoing disadvantages inherent in the known types of mirror systems now present in the prior art, the present invention provides a new combined forward and rearward viewing mirror system construction wherein the same can be utilized for seeing around vehicles.

The general purpose of the present invention, which will be described subsequently in greater detail, is to provide a new combined forward and rearward viewing mirror system apparatus and method which has many of the advantages of the mirror systems mentioned heretofore and many novel features that result in a new combined forward and rearward viewing mirror system which is not anticipated, rendered obvious, suggested, or even implied by any of the prior art mirror systems, either alone or in any combination thereof.

To attain this, the present invention generally comprises a system for permitting a driver using the mirror system to see objects forward and reward of the automobile. The system is mountable to a motor vehicle. The system comprises a housing having a front side, a back side, a proximal end and distal end. The front side has an opening therein to permit viewing into an interior of the housing. A window is in the front side for seeing forward through the housing. An arm having a first end and a second end secures the housing to a motor vehicle. The first end of the arm is adapted for mounting to the automobile door. The second end of the arm is coupled to the housing. A first mirror for viewing objects rearward of the motor vehicle is mounted in the interior of the housing and is angled toward the proximal end of the housing. A second mirror for viewing objects forward of the automobile is mounted in the interior of the housing and is oriented generally toward the front side of the housing. A third mirror for viewing objects forward of the automobile is mounted in the interior of the housing and is oriented toward the front side of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combined forward and rearward viewing mirror system apparatus and method which has many of the advantages of the mirror systems mentioned heretofore and many novel features that result in a new combined forward and rearward viewing mirror system which is not anticipated, rendered obvious, suggested, or even implied by any of the prior art mirror systems, either alone or in any combination thereof.

It is another object of the present invention to provide a new combined forward and rearward viewing mirror system which may be easily and efficiently manufactured and marketed.

It is a further object of the present invention to provide a new combined forward and rearward viewing mirror system which is of a durable and reliable construction.

An even further object of the present invention is to provide a new combined forward and rearward viewing mirror system which is susceptible of a low cost of manufacture with regard to both materials and labor, and which accordingly is then susceptible of low prices of sale to the consuming public, thereby making such combined forward and rearward viewing mirror system economically available to the buying public.

Still yet another object of the present invention is to provide a new combined forward and rearward viewing mirror system which provides in the apparatuses and methods of the prior art some of the advantages thereof, while simultaneously overcoming some of the disadvantages normally associated therewith.

Still another object of the present invention is to provide a new combined forward and rearward viewing mirror system for seeing around vehicles.

Yet another object of the present invention is to provide a new combined forward and rearward viewing mirror system which includes a system for permitting a driver using the mirror system to see objects forward and reward of the automobile. The system is mountable to a motor vehicle. The system comprises a housing having a front side, a back side, a proximal end and distal end. The front side has an opening therein to permit viewing into an interior of the housing. A window is in the front side for seeing forward through the housing. An arm having a first end and a second end secures the housing to a motor vehicle. The first end of the arm is adapted for mounting to the automobile door. The second end of the arm is coupled to the housing. A first mirror for viewing objects rearward of the motor vehicle is mounted in the interior of the housing and is angled toward the proximal end of the housing. A second mirror for viewing objects forward of the automobile is mounted in the interior of the housing and is oriented generally toward the front side of the housing. A third mirror for viewing objects forward of the automobile is mounted in the interior of the housing and is oriented toward the front side of the housing.

Still yet another object of the present invention is to provide a new combined forward and rearward viewing mirror system that will show oncoming vehicles when pulling into on-coming traffic from a parallel parked position.

Even still another object of the present invention is to provide a new combined forward and rearward viewing mirror system that will show on coming vehicles when passing another vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
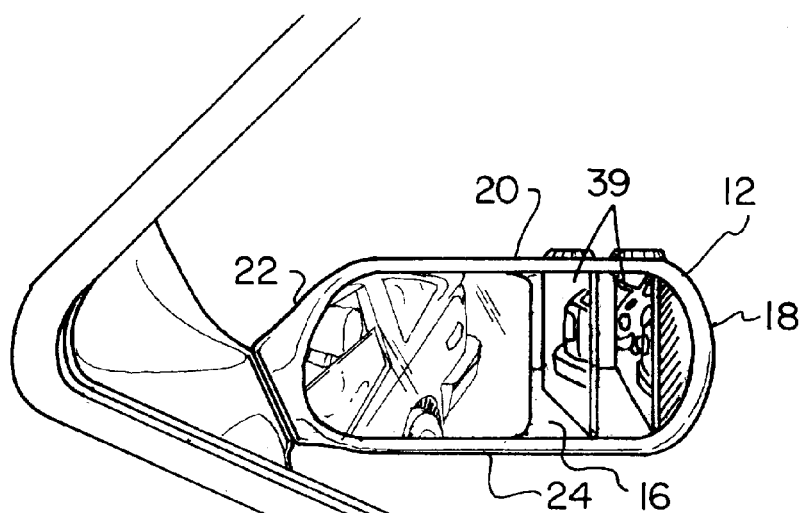
FIG. 1 is a schematic perspective view of a new combined forward and rearward viewing mirror system according to the present invention.
Figure 2:
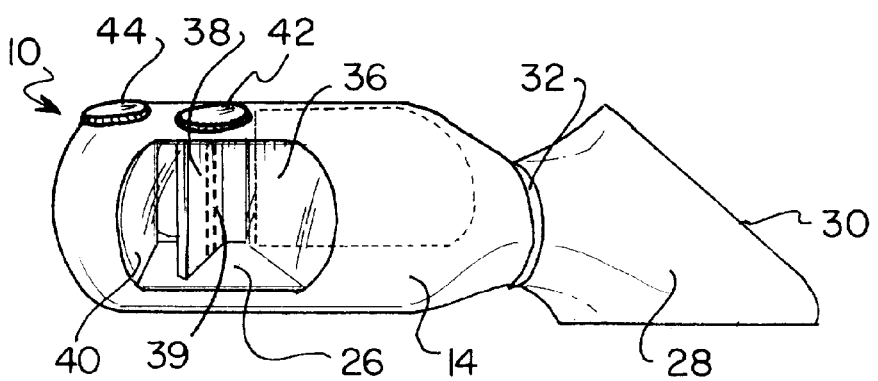
FIG. 2 is a schematic perspective view of the present invention.
Figure 3:
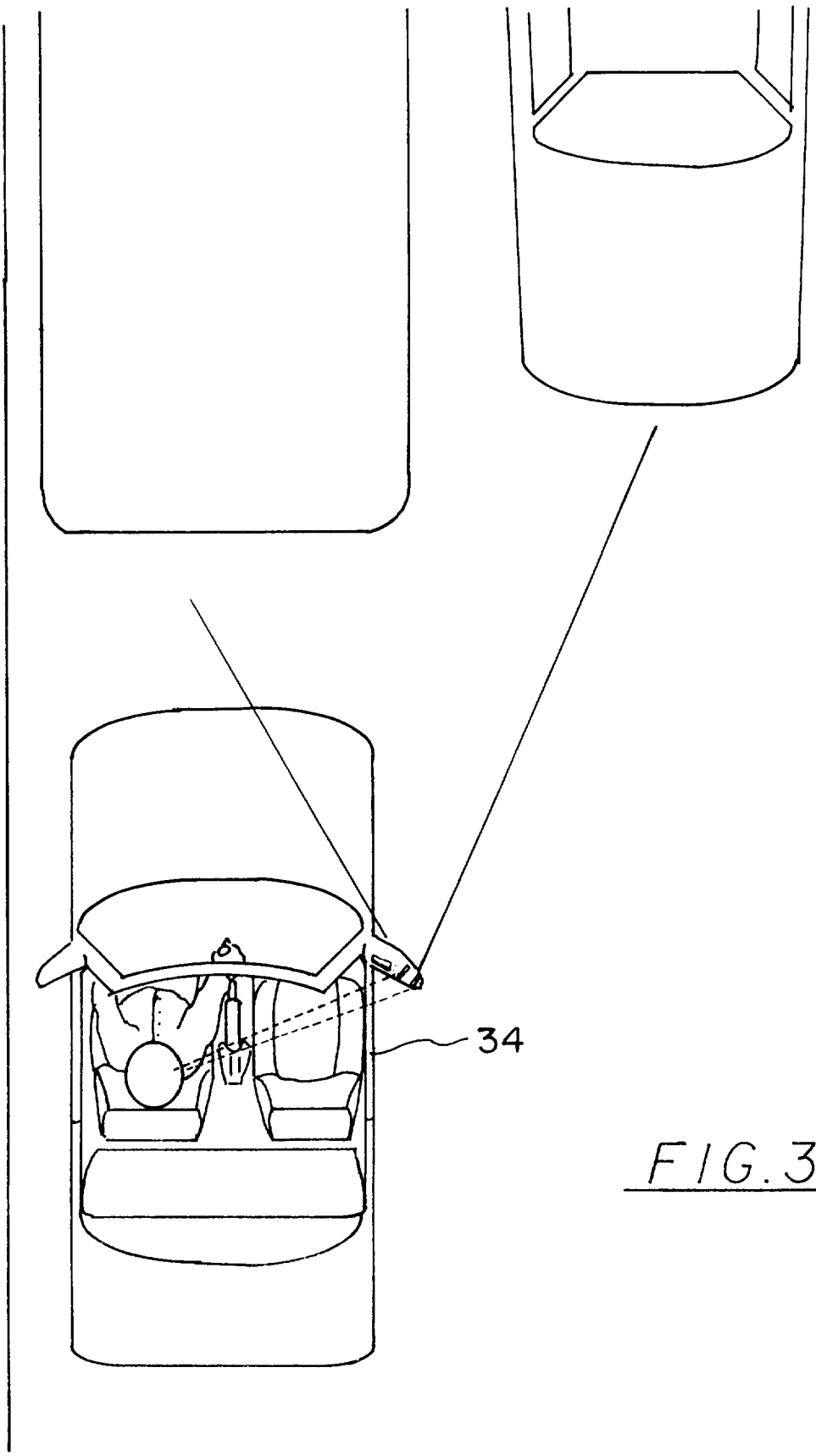
FIG. 3 is a schematic plan view of the present invention mounted to a vehicle.

With reference now to the drawings, and in particular to FIGS. 1 through 3 thereof, a new combined forward and rearward viewing mirror system embodying the principles and concepts of the present invention and generally designated by the reference numeral 10 will be described.

As best illustrated in FIGS. 1 through 3, the combined forward and rearward viewing mirror system 10 generally comprises a combined forward and rearward viewing mirror viewing system for permitting a driver using the mirror system to see objects forward and reward of the automobile.

The system comprises a housing 12 having a front side 14 and a back side 16. The front side 14 has an opening therein to permit viewing into an interior of the housing 12. The housing has a distal 18 end, a middle portion 20 and a proximal end 22. The front side 14 of the housing is generally concave, and the front and back sides of the housing meeting at a peripheral edge 24 of the housing 12.

A window is in the front wall 14 for seeing forward through the housing 12. The window extends from the middle portion 20 of the housing 12 to a location adjacent to the distal end 18 of the housing 12.

A covering 26 for the window is mounted on the front side 14 and extends across the window. The covering 26 is transparent and is preferably formed from plastic, although glass may be used.

An arm 28 secures the housing to an automobile door. The arm has a first end 30 and a second end 32 and is adapted for mounting the housing 12 to an automobile door 34. The second end 32 of the arm is rotatably coupled to the housing 12. The second end 32 of the arm is coupled to the peripheral edge 24 of the housing 12. The second end 32 of the arm 28 is abutted against the proximal end 22 of the housing 12.

A first mirror 36 views objects rearward the automobile. The first mirror 36 is fixedly mounted in the interior of the housing 12. However, if the arm 28 were fixedly mounted to the housing 12, the first mirror 36 would be rotatably mounted within the housing. Further, the first mirror 36 and the juncture of the arm 28 and housing could both be rotatable. The first mirror 36 is generally located adjacent to the proximal end 22 of the housing. The first mirror 36 is angled toward the proximal end of the housing.

A second mirror 38 views objects forward of the automobile and is rotatably mounted in the interior of the housing 12. The second mirror 38 is generally located in the middle portion 20 of the housing 20. The second mirror 38 is oriented generally toward the front side 14 of the housing 12.

A third mirror 40 views objects forward of the automobile and is rotatably mounted in the interior of the housing 12. The third 40 mirror is generally located adjacent to the distal end 18 of the housing 12 and is oriented toward the front side 14 of the housing 12.

The first mirror 36 is adapted for displaying to the driver objects reward of the car. The second mirror 38 is adapted for displaying to the driver objects to forward and to the side of the automobile, or to the front of the automobile. The third mirror 40 is adapted for displaying to the driver objects to forward and far side of the automobile.

Preferably, a pair of pivot shafts, 39 mount the second 38 and third 40 mirrors. One of the pivot shafts pivotally mounts each of the second 38 and third mirrors 40. Each of the pivot shafts has a first end extending through the front side 14 of the housing 12.

A pair of knobs 42, 44 adjust the second 38 and third 40 mirrors. Each of the knobs is mounted to one of the first ends of the pivot shafts.

In use, the devices are attached to the automobile in place of a standard rear-view mirror. The first mirror acts as a standard rear-view mirror. The second and third mirrors give forward views with the third mirror having a wider field of vision than the second. The driver can see around vehicles in front of the car using the second and third mirrors.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combined forward and rearward viewing mirror viewing system for permitting a driver using the mirror system to see objects forward and rearward of a motor vehicle, the system being mountable to a motor vehicle, said system comprising:

a housing having a front side and a back side, said back side having an opening therein to permit viewing into an interior of said housing, said housing having a distal end, a middle portion and a proximal end;

a window in said front side of said housing;

an arm for securing said housing to motor vehicle, said arm having a first end and a second end, said first end of said arm being adapted for mounting to a door of the motor vehicle, said second end of said arm being coupled to said housing;

a first mirror for viewing objects forward of the motor vehicle in a first field of view, said first mirror being mounted in said interior of said housing, said mirror being angled toward the proximal end of the housing;

a second mirror for viewing objects forward of the mirror vehicle, said second mirror being mounted in said interior of said housing;

a thrid mirror for viewing objects forward of the motor vehicle, said thrid mirror being mounted in said interior of said housing;

wherein said first mirror is located adjacent to said proximal end of said housing, said third mirror is located adjacent to said distal end of said housing, and said second mirror is located between said first mirror and said second mirror;

wherein said second mirror is pivotally mounted on a pivot shaft in said housing, said pivot shaft having an adjustment knob mounted thereon for permitting adjustment of an angle of said second mirror with respect to said window for adjusting a seconded field of view reflected by said second mirror; and wherein said third mirror is pivotally mounted on a pivot shaft in said housing, said pivot shaft having an adjustment knob mounted thereon for permitting adjustment of an angle of said third mirror with respect to said window for adjusting a third field of view reflected by said second mirror, wherein said third mirror is adjustable independently of said second mirror.

2. The combined forward and rearward viewing mirror viewing system as in claim 1, wherein said front side of said housing is generally concave, said front and back sides of said housing meeting at a peripheral edge of the housing.

3. The combined forward and rearward viewing mirror viewing system as in claim 1, further comprising a covering for said window, said covering being mounted on said front side, said covering extending across said window, said covering being transparent.

4. The combined forward and rearward viewing mirror viewing system as in claim 1, wherein said second end of said arm is rotatably coupled to said housing, said second end of said arm being abutted against said proximal end of said housing.

5. A combined forward and rearward viewing mirror viewing system for permitting a driver using the mirror system to see objects forward and rearward of an automobile, said system comprising:

a housing, said housing having a front side and a back side, said front side having an opening therein to permit viewing into an interior of said housing, said housing having a distal end, a middle portion and a proximal end, said front side of said housing being generally concave, said front and back sides of said housing meeting at a peripheral edge of the housing;

a window in said front side for seeing forward through said housing, said window extending from said middle portion of said housing to a location adjacent to said distal end of said housing;

a covering for said window, said covering being mounted on said front side, said covering extending across said window, said covering being transparent, said covering being fromed from plastic;

an arm for securing said housing to an automobile door, said arm having a first end and a second end, said first end of said arm being adapted for mounting to said automobile door, said second end of said arm being coupled to said peripheral edge of said housing, said second end of said arm being abutted against said proximal end of said housing;

a first mirror for viewing objects rearward automobile, said first mirror being fixedly mounted in said interior of said housing, said first mirror being generally located adjacent to said proximal end of said housing, said first mirror being angled toward the proximal end of the housing;

a second mirror for viewing objects forward of said automobile, said second mirror being rotatably mounted in said interior of said housing, said second mirror being generally located in said middle portion of said housing, said second mirror being oriented generally toward said front side of said housing;

a thrid mirror for viewing objects forward of said automobile, said thrid mirror being rotatably mounted in said interior of said housing, said thrid being generally located adjacent to said distal end of said housing, said third mirror being oriented toward said front side of said housing;

wherein said first mirror is adapted for displaying to the driver objects rearward of the automobile, wherein said second mirror is adapted for displaying to the driver objects forward and to the side of the automobile, wherein said third mirror is adapted for displaying to the driver objects forward and to the far side of the automobile;

a pair of pivot shafts for mounting said second and third mirrors, one of said pivot shofts pivotally mounting each of said second and third mirrors, each of said pivot shaft having a first end extending through said front side and positioned generally adjacent to said opening in a top portion of said front side; and a pair of knobs for adjusting said second and third mirrors, each of said knobs being mounted to one of said first ends of said pivot shafts.

6. A combined forward and rearward viewing mirror viewing system for permitting a driver using the mirror system to see objects forward and rearward of an automobile, said system being mountable to the automobile, said system comprising:

a housing, said housing having a front side and a back side, said front side having an opening therein to permit viewing into an interior of said housing, said housing having a distal end, a middle portion and a proximal end, said front side of said housing being generally concave, said front and back sides of said housing meeting at a peripheral edge of the housing;

a window in said front side for seeing forward through said housing;

a covering for said window, said covering being mounted on said front side, said covering extending across said window, said covering being transparent;

an arm for securing said housing to an automobile, said arm having a first end and a second end, said first end of said arm being adapted for mounting to an automobile door, said second end of said arm being coupled to said housing;

a first mirror for viewing objects rearward of the automobile, said first mirror being mounted in said interior of said housing, said mirror being angled toward the proximal end of the housing;

a second mirror for viewing objects forward of said automobile, said second mirror being mounted in said interior of said housing, said second mirror being oriented generally toward said front side of said housing; and a thrid mirror for viewing objects forward of said automobile, said thrid mirror being mounted in said interior of said housing, said thrid mirror being oriented toward said front side of said housing;

wherein said second and third mirrors are rotatably mounted in said housing, a pair of pivot shafts mounting said second and third mirrors, one of said pivot shafts pivotally mounting each of said second and third mirrors, each of said pivot shafts having a first end extending through said front side and positioned generally adjacent to said opening in a top portion of said front side; and including a pair of knobs for adjusting said second and third mirrors, each of said knobs being mounted to one of said first ends of said pivot shafts.

7. The combined forward and rearward viewing mirror viewing system as in claim 6, wherein said second end of said arm is rotatably coupled to said housing, said second end of said arm being abutted against said proximal end of said housing.

8. The combined forward and rearward viewing mirror viewing system as in claim 7, wherein said first mirror is generally located adjacent to said proximal end of said housing, said second mirror being rotatably mounted in said interior of said housing, said second mirror being generally located in said middle portion of said housing, and said third mirror being rotatably mounted in said interior of said housing, said third mirror being generally located adjacent to said distal end of said housing.

* * * * *